United States Patent
Baker et al.

[15] 3,683,668
[45] Aug. 15, 1972

[54] COMPASS CALIBRATOR

[72] Inventors: Donald H. Baker; David R. Brickner, both of Phoenix, Ariz.

[73] Assignee: Sperry Rand Corporation

[22] Filed: Jan. 26, 1971

[21] Appl. No.: 109,872

[52] U.S. Cl. ..............................73/1 E, 33/204 FA
[51] Int. Cl. ...........................................G01c 17/38
[58] Field of Search .......................................73/1 E

[56] References Cited

UNITED STATES PATENTS

| | | | |
|---|---|---|---|
| 2,852,859 | 9/1958 | Depp | 33/225 |
| 3,071,959 | 1/1963 | Depp | 73/1 E |
| 3,418,840 | 12/1968 | Wallace | 73/1 E |

Primary Examiner—S. Clement Swisher
Attorney—S. C. Yeaton

[57] ABSTRACT

A magnetic compass calibrator module, suitable for plug-in or integral operation with a vehicle compass system having a magnetic azimuth detector, measures and calibrates any magnetic error induced in the detector by the vehicle and/or its cargo. A feature of the compass calibrator is that of utilizing a portion of the electronic magnetic compass control system of the vehicle to perform the calibration computation functions and thereby reduce the size and complexity of the calibrator itself.

14 Claims, 7 Drawing Figures

FIG.1.

PATENTED AUG 15 1972 3,683,668

INVENTORS
DONALD H. BAKER
DAVID R. BRICKNER
BY

*H.P. Terry*
ATTORNEY

FIG. 4a.

INVENTORS
DONALD H. BAKER
DAVID R. BRICKNER
BY
ATTORNEY

SWITCH CONTACT POSITION

| MODE | CONTACT SET | | |
|---|---|---|---|
| | A | B | C |
| NORM | CLOSE | OPEN | OPEN |
| HDG 1 | OPEN | CLOSE | OPEN |
| HDG 2 | OPEN | CLOSE | OPEN |
| SWING | CLOSE | CLOSE | CLOSE |

INVENTORS
DONALD H. BAKER
DAVID R. BRICKNER
BY
ATTORNEY

COMPASS CALIBRATOR

BACKGROUND OF THE INVENTION

1. Field of the Invention

The invention relates to methods and apparatus used to calibrate compasses, utilizing magnetic azimuth detectors, with respect to the vehicles within which they are housed and the cargo that the vehicle may be carrying. The calibration error referred to is generally termed the deviation error and is defined as the angular difference between actual vehicle magnetic heading and the compass indicated heading.

2. Description of the Prior Art

Any magnetic azimuth detector is subject to components of the earth's magnetic field and the disturbing or hard iron field inherent in the vehicle and/or its cargo. The pendulous character of the magnetic azimuth detector rejects the vertical component of the earth's field during unaccelerated motion of the vehicle and only the horizontal component is utilized in determining magnetic heading. When the vehicle changes heading through 360°, the disturbing field moves with it to make a 360° rotation with respect to the earth's field. This causes the horizontal component of the total magnetic vector, the sum of the earth's field and the disturbing field, to oscillate with respect to the normal direction of the earth's horizontal field. The detector system senses the sum of these fields so that this single cycle error goes through one positive maximum and one negative maximum during a 360° change in heading. For the accurate navigation of any vehicle depending on an earth's field sensitive detector, it is necessary to take these errors into account and to make the necessary correction for the same either in adjusting the indicated heading of the craft from an error table or by compensating the magnetic detector for the errors through suitable compensating means. While hard iron error has been used for this discussion, it is recognized that index error and two cycle transmission errors in the vehicle's electronic control equipment may also be present and must be corrected in like manner.

In many prior calibration systems, the vehicle had to be rotated through 360° and the output of the compass was compared with the known actual magnetic heading at each of several positions. An error table could then be derived and used to compensate the errors. This method was necessarily laborious, time consuming and required the physical space and equipment to orient the aircraft in each of several headings. An improved calibration method, as described in U. S. Pat. Nos. 2,887,872 issued May 26, 1959 entitled "Method of Measuring and Compensating for Deviation Errors for Earth's Field Responsive Instruments" and 2,887,873 issued May 26, 1959 entitled "Method of Measuring and Compensating for Deviation Errors in Earth's Field Sensitive Direction Indicators", both assigned to the instant assignee, did not require rotation of the aircraft. Instead, this system subjected the detector to an artificially created equivalent earth's magnetic field for each of several selected headings. For each applied field corresponding to a selected heading, the compass output heading was compared to the selected heading. Thereby the errors could be obtained and the requisite compensation could be effected. While this system was a great step forward in the compass calibration art, it still suffered from the extensive and complex compass swinging apparatus equipment required and the additional requirement for precise operating procedures. Other patents, such as U.S. Pat. Nos. 2,700,745 issued Jan. 25, 1955 entitled "Data Transmission System and Corrector Therefor"; 2,810,102 issued Oct. 15, 1957 entitled "Device for Compensating a Data Transmission System for Two Cycle Errors"; and 2,974,264 issued Mar. 7, 1961 entitled "Synchro Servosystem Two-Cycle Error Compensator", all assigned to the instant assignee, describe means for detecting and compensating for two cycle errors.

SUMMARY OF THE INVENTION

The invention provides a method and apparatus for determining the deviation error present in a magnetic detector which is simple, speedy and requires a minimum of peripheral equipment. In essence, the vehicle containing the magnetic detector is positioned on a predetermined swing line at the calibration site. The heading orientation of the swing line is arbitrary. Misalignment of the vehicle axis from the line is determined. A portable device, comprising the calibration control features, is physically attached to the vehicle in such a manner that it cooperates with a portion of the vehicle's electronic heading reference system (compass). The heading and misalignment data is entered into and stored in the calibrator along with the magnetic detector output. The vehicle is then rotated 180° and the new heading, misalignment, and detector output information is entered and stored in the calibrator.

In the calibration procedure, the vehicle's electronic control equipment under control of the calibrator cancels the effect of the earth's magnetic field and superimposes a signal on the detector equivalent to a selected heading. Other extraneous signals present represent the deviation due to the field superimposed on the detector by the vehicle and/or its cargo. These extraneous signals also include any index errors due to detector misalignment, or transmission errors due to the vehicle's electronic control equipment. All the remaining signals are rotated by the vehicle electronic control equipment under command of the calibrator to each of a predetermined number of headings. A display within the calibrator indicates the index, one cycle, or two cycle transmission errors present at each selected heading. These errors are adjusted to a minimum by means of the compensatory apparatus available in the vehicle's electronic control equipment. On completion of the rotation procedure, the magnetic detector has been calibrated and the calibrator may be disconnected from the vehicle. Any subsequent output of the detector for any heading will be automatically adjusted by the vehicle electronic control equipment to compensate for the error present at that heading and the final output will reflect an accurate magnetic heading of the vehicle.

A primary advantage of the invention is to provide a compact, rapid, easily operable magnetic compass calibrator.

Another advantage of the invention is to provide a compass calibration system requiring only two vehicle headings for determining the magnetic detector errors.

Another advantage of the invention is to provide a compass calibration system utilizing a portion of the existing vehicle electronic control equipment for computation of the deviation error.

Another advantage of the invention is to provide a calibrating system that may be used with or without a compass rose.

Another advantage of the invention is to provide a calibration system that may be conveniently used after cargo is loaded on the vehicle.

DESCRIPTION OF THE PREFERRED EMBODIMENT

Magnetic detectors as discussed in this application refer to that class of detectors usually termed flux valves. That is, detectors whose sensitive element essentially consists of a core element of highly permeable material upon which are wound suitable energized and output or pick-up windings. This core element is generally in the shape of an equiangular Y, the pick-up coils being mounted on the legs of the core, the energizing coil mounted in proximity to the junction of the core, and the assembly being maintained generally horizontal by means of a pendulous mass and gimbal support. Collector horns may be provided at the ends of the legs for concentrating the magnetic field in the legs. The flux valve is so excited that each pick-up coil has induced therein a horizontal component of any magnetic field in which it lies and the three coils together provide a measure of the direction of the magnetic field in which the valve is located. Further discussion of flux valves may be found in U. S. Pat. No. 2,852,859 issued Sept. 23, 1958 entitled "Flux Valve Compensating System" and a patent application Ser. No. 796,349 filed Feb. 4, 1969, now U.S. Pat. No. 3,575,610 entitled "Earth's Field-Sensitive Magnetometer for Use in Compass Systems", both assigned to the instant assignee.

Regardless of how meticulously a flux valve is made, the electromagnetic properties of each leg of the Y and its coil differ. One such error is due to the differing air gaps between the extremities of the adjacent legs on their collector horns. This error is nulled by a process known as cross talk calibration and the results of this process are used to compensate for this error. Another error is due to a misalignment between the flux valve and the reference line of the aircraft which will appear as a single cycle error similar to the effects of permanent magnetic fields in the aircraft. This inherent inability to distinguish a flux valve misalignment from a permanent field necessitates extreme care in aligning the flux valve. The problem may be obviated by using a preindexed flux valve. Such a flux valve has a precise mechanical reference to accurately identify its magnetic axis. When installed in a properly aligned aircraft location, the flux valve will be accurately aligned to the aircraft fore-aft axis. Tests have shown that installations having less than 0.1° mount alignment error can be consistently achieved. The instant invention is directed to using precalibrated and preindexed flux valves to minimize these possible error sources and distinguish them from those errors arising from the operation of the magnetic detector and its electronic control apparatus as a system. Thereby, the error sources from individual magnetic detector components which are generally unaffected by the operation of the components as a system can be more effectively segregated. The invention may, of course, be used with non-calibrated and non-indexed flux valves, but the above-described error sources must be segregated and compensated before the invention may be used to its best advantage.

In operation, the magnetic detector provides an output signal representative of the magnetic heading of the vehicle, within which it is mounted. The three wire a.c. output signal is converted to sine/cosine format and demodulated in the current servo. The demodulated signals are fed to computational apparatus wherein it is combined with data from the gyroscopic platform and the combination provides both short term and long term heading reference information for the vehicle directional control system. In addition, the detector output signal is fed into a loop which operates to null the detector output signal. Further discussion of this servo loop may be found in U.S. patent application Ser. No. 787,143, filed Dec. 26, 1968, entitled "Compass System and Components Therefor Having Automatic Field Cancellation" and assigned to the instant assignee. As described in the instant application, the computational apparatus is a digital computer and the signal processing and computation of the calibration procedure is performed in digital format. A computational technique such as described in the September 1959 issue, page 330 of IRE Transactions on Electronic Computers in an article entitled "The Cordic Trigonometric Computing Technique" may be used.

Figure 1:
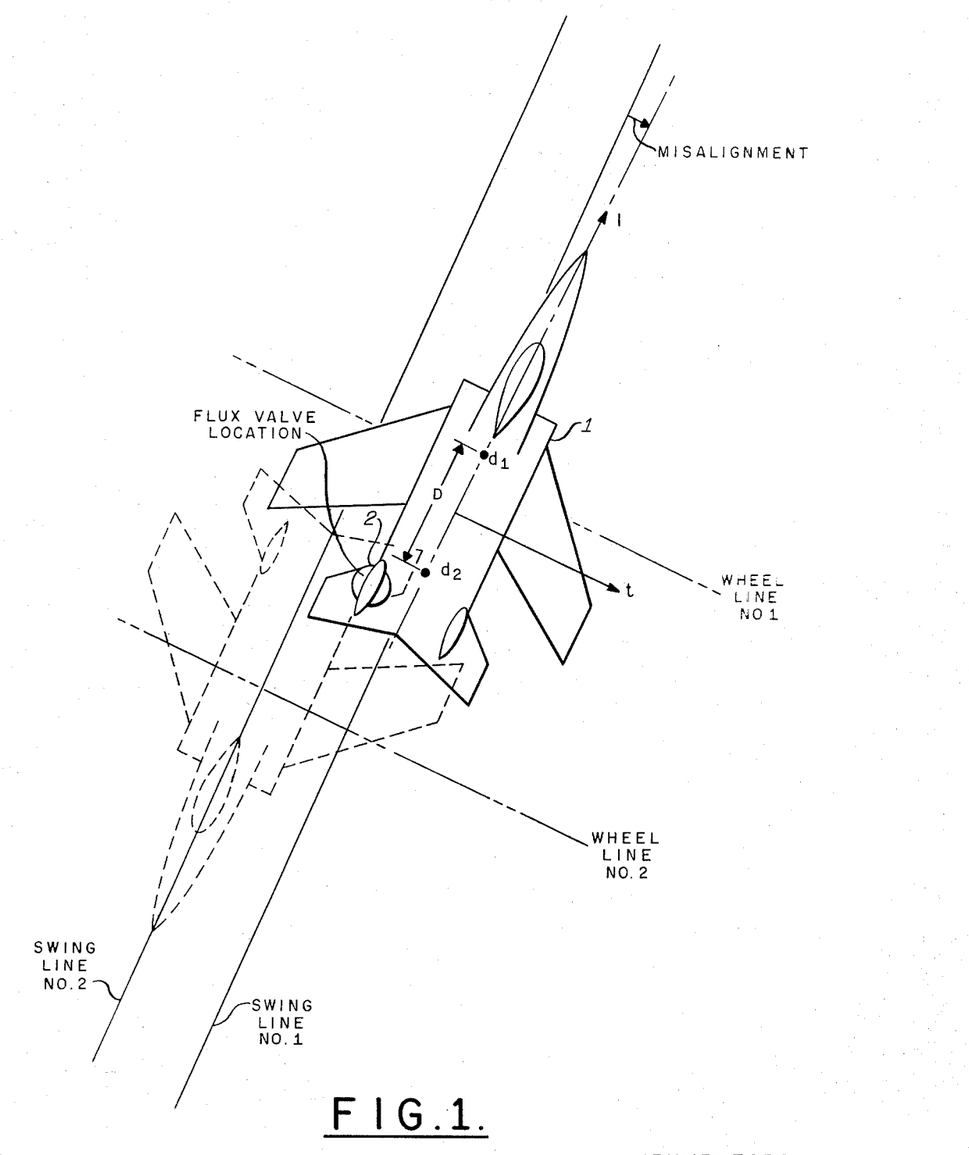
FIG. 1 illustrates the positioning of a vehicle on an arbitrarily selected swing line.

Assuming that the vehicle, such as the aircraft 1 depicted in FIG. 1 has a precalibrated, preindexed flux valve 2, the compass calibration procedure may be described in accordance with the invention. FIG. 1 illustrates the aircraft 1 located at the calibration site, the latter may be a compass rose but is not limited thereto. The two swing lines shown permit the aircraft 1 to be positioned on reciprocal headings while maintaining the flux valve 2, over the same ground location to assure a constant ambient earth's field for each heading. Of course, if the valve were mounted on the longitudinal axis of the aircraft, only a single swing line would be necessary. The heading of the lines is immaterial, provided that the lines are parallel. In describing the operation of the compass calibration, reference is also made to FIGS. 2a and 2b, depicting the vectorial relationships and FIG. 3 depicting the calibrator 3.

The aircraft 1 is first positioned on swing line 1 (Hdg 1). A reference line normal to the swing line 1, such as the wheel line 1, is marked for future reference.

The calibrator 3 may be connected to the aircraft's electronic attitude and heading reference set (AHRS) via appropriate switches and cabling at this time and both units are activated. The mode switch 4 is turned to the position marked Hdg 1. Any angular misalignment error, $M_1$, between the swing line 1 and the aircraft axis must be measured and entered into the calibrator 3 by the misalignment (MISAL) control 5. For the convenience of the operator, the calibrator 3 may be constructed to permit the operator to measure the misalignment angle as a function of the lateral distance the aircraft is off the swingline. Thus, the MISAL control 5 on the calibrator panel 6 may be referenced in inches and the operator would then enter the difference of measured distances between the swing line and two predetermined points ($d_1, d_2$) on the vehicle, for example by using plumb bobs (where D is equal to the distance between the two reference points, $d_1$ and $d_2$; $M_1 = d_1 - d_2$ and the misalignment angle is arctan $M_1/D$).

Figure 2A:
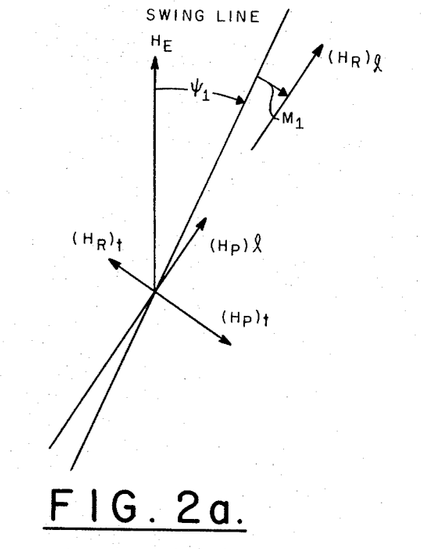
FIGS. 2a and 2b graphically illustrate the vertical relationships of imposed errors.
Figure 2B:
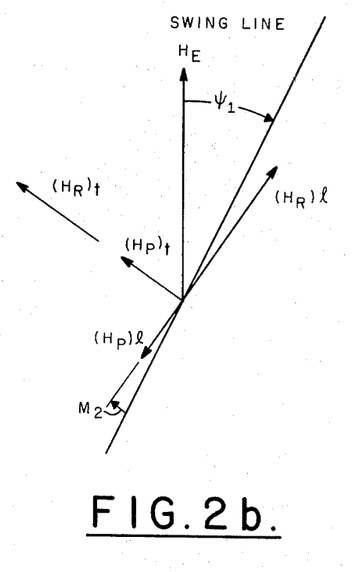
Figure 3:
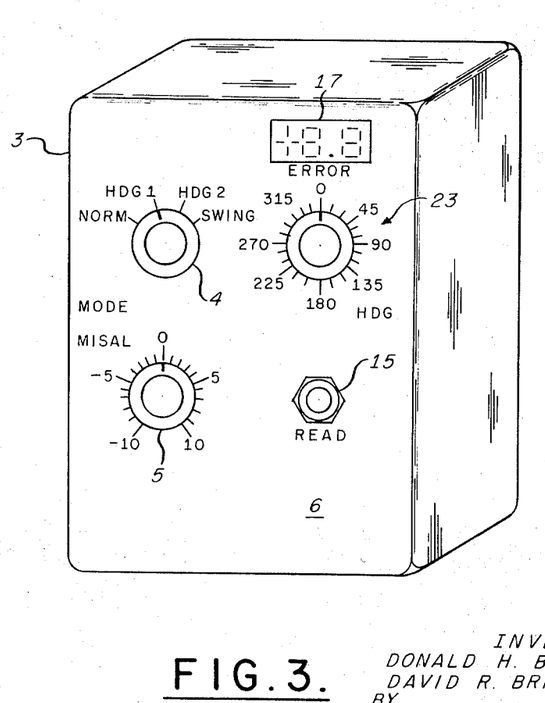
FIG. 3 illustrates the calibrator control panel.

FIG. 2a vectorially represents magnetic fields influencing the aircraft flux valve 2. The angular difference between the swing line 1 and North is represented $\psi_1$. The horizontal vector of the earth's field is represented as $H_e$ and the longitudinal and transverse components of the aircraft's permanent magnetic field are represented by $(H_p)_l$ and $(H_p)_t$, respectively. The vectorial resultant of the earth's field and the permanent magnetic field along the longitudinal and transverse axis, respectively, may be expressed as:

$$(H_R)_l = H_e \cos(\psi_1 + M_1) + (H_p)_l$$

and $$(H_R)_t = H_e \sin(\psi_1 + M_1) + (H_p)_t$$

These equations represent the magnetic fields acting upon the flux valve 2 and the equivalent cancelling fields would necessarily be written as $$(H_1)_l = -(H_R)_l$$

$$(H_1)_t = -(H_R)_t$$

Figure 4A:
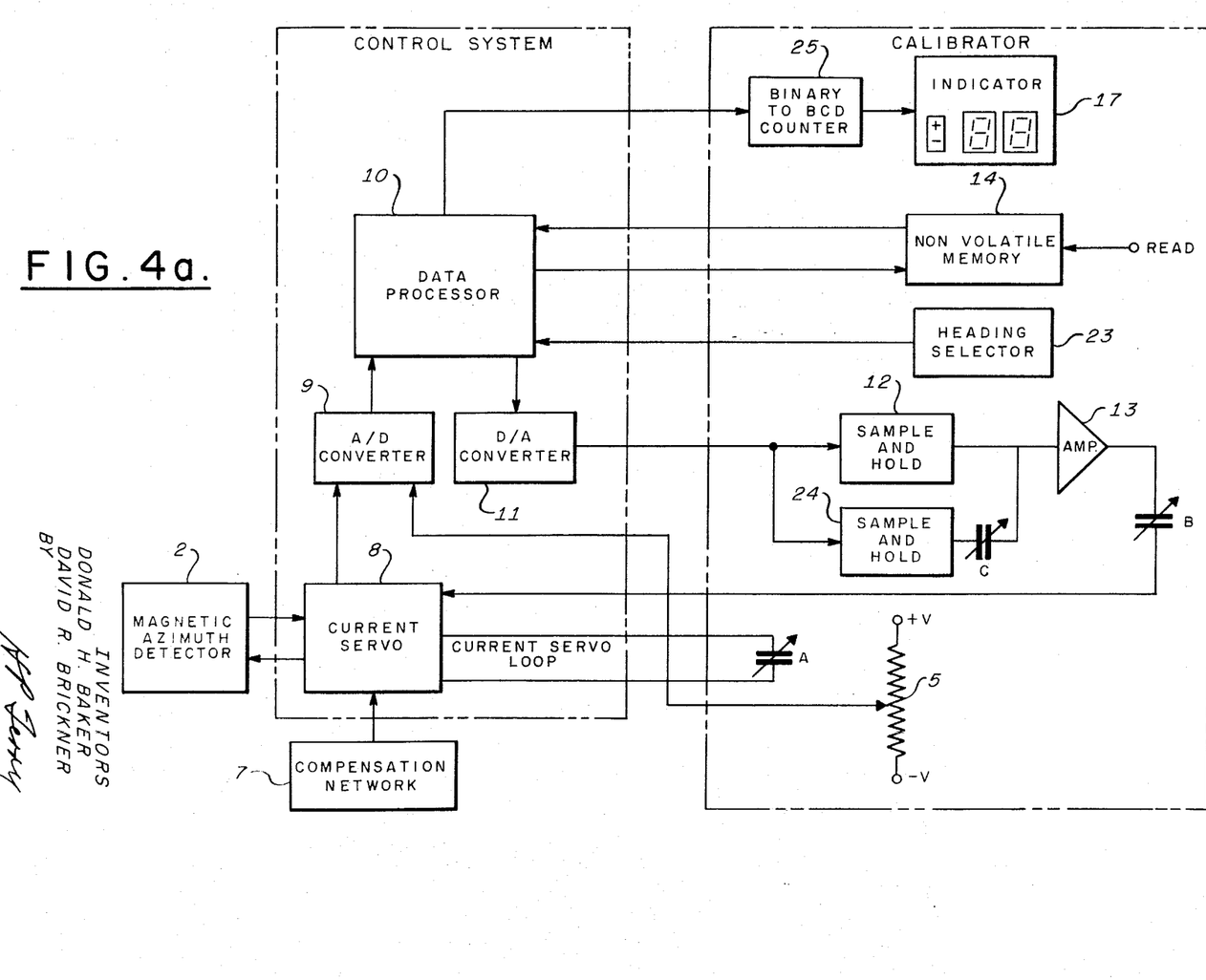
FIG. 4a illustrates the control circuit diagram including that portion of the electronic control system contained within the vehicle and utilized by the calibrator.

FIG. 4, illustrating the pertinent portions of the aircraft AHRS system used in conjunction with the calibrator 3 will now be referenced in describing the Hdg 1 mode procedure. FIG. 4a illustrates four distinct functional groupings of equipment: first, the magnetic detector 2; second, the apparatus housed within the aircraft AHRS that is common to the calibration procedure; third a compensation network 7 contained within the aircraft for nulling the calibration errors; fourth, the apparatus housed within the calibrator 3 and detachable, if desired, from the aircraft. It is to be understood that the calibrator may be self contained. That is, the computational equipment utilized by the calibrator, which is shown housed within the AHRS, may be contained within the calibrator itself. Thus, the calibrator may be a fully self contained portable unit that may be plugged into the detector output circuit. Alternatively, the calibrator equipment may be made an integral and permanent part of the aircraft compass system electronics.

In the Hdg 1 mode, the current servo loop is opened by contact A set (normally closed). Similarly, contact B set (normally open) is closed. Further discussion of this type of current servo and servo loop may be found in U.S. patent application Ser. No. 787,143, filed Dec. 26, 1968 entitled "Compass System and Components Therefor Having Automatic Field Cancellation" and assigned to the instant assignee. The output of the azimuth detector 2 is fed to the current servo 8 and the current servo loop is alternatively completed through the A/D converter 9, the data processor 10, the D/A converter 11, the sample and hold circuit 12, summing amplifier 13 and through switch B. The current servo output fed to the data processor 10 is in digital form and may be transferred to the non-volatile memory 14 of the calibrator 3 by activation of the READ switch 15 (FIG. 3). Similarly, the misalignment angle, inserted by dial 5 (FIG. 3) represented as a variable potentiometer 5 in FIG. 4a, is converted to digital form and is inserted into the non-volatile memory 14. The procedure for Hdg 1 is now completed.

For the Hdg 2 mode, the aircraft 1 is rotated 180° and aligned along swing line 2. The aircraft 1 should be placed on swing line 2 such that the flux valve 2 is once again in substantially above the same ground location. The location of the wheel line 1 with respect to the flux valve position as determined in the Hdg 1 mode may be used to facilitate orientation of the flux valve 2 to the desired position in the Hdg 2 mode.

After alignment, the mode switch 4 is turned to the position marked Hdg 2. The misalignment information, $M_2$, is obtained as previously described with respect to misalignment $M_1$ and is entered into the calibrator 3. The new vectorial relationships between earth's field $H_e$, heading $\psi_2$, (where $\psi_2 = \psi_1 + 180°$) misalignment $M_2$, the longitudinal and transverse components of the aircraft's permanent magnetic field $(H_p)_l$ and $(H_p)_t$, respectively, are shown in FIG. 2b.

The vectorial resultant of the earth's field and the permanent magnetic field along the longitudinal and transverse axis may be expressed as:

$$(H_R)_l = -H_e \cos(\psi_1 + M_2) + (H_p)_l$$

$$(H_R)_t = -H_e \sin(\psi_1 + M_2) + (H_p)_t$$

These equations represent the magnetic fields acting upon the flux valve 2 and the equivalent cancelling fields would necessarily be written as:

$$(H_2)_l = -(H_R)_l$$

$$(H_2)_t = -(H_R)_t$$

In the Hdg 2 mode, the previously described signal processing will occur with respect to $(H_2)_l$ and $(H_2)_t$, as with $(H_1)_l$ and $(H_1)_t$, except that on enabling the READ switch 15, $(H_1)_l$ will be subtracted from $(H_2)_l$ and $(H_1)_t$ will be subtracted from $(H_2)_t$ by the data processor 10. It will be remembered that the terms $(H_1)_l$, $(H_1)_t$, $(H_2)_l$ and $(H_2)_t$ represent signals equal and opposite to their respective resultant signals for each axis in each heading. Therefore, they represent cancelling fields. The mathematical representations of the average cancelling field may be written as follows.

$$(H_{12})_l = \frac{(H_2)_l - H_1)_l}{2}$$

$$= \frac{H_e}{2}[\cos(\psi_1 + M_1) + \cos(\psi_1 + M_2)]$$

$$(H_{12})_t = \frac{(H_2)_t - (H_1)_t}{2}$$

$$= \frac{H_e}{2}[\sin(\psi_1 + M_2) + \sin(\psi_1 + M_1)]$$

It will be noted that this manipulation cancels the permanent field components, $(H_p)_1$ and $(H_p)_t$, and the remaining signal is the signal representative of the signal necessary to cancel the effect of the earth's field, $H_e$. As it may be presumed that there will be some misalignment errors, the signals $(H_{12})_1$ and $(H_{12})_t$ are rotated through the angle represented by $(M_2 - M_1)/2$, and any error due to misalignment is minimized.

Figure 5:
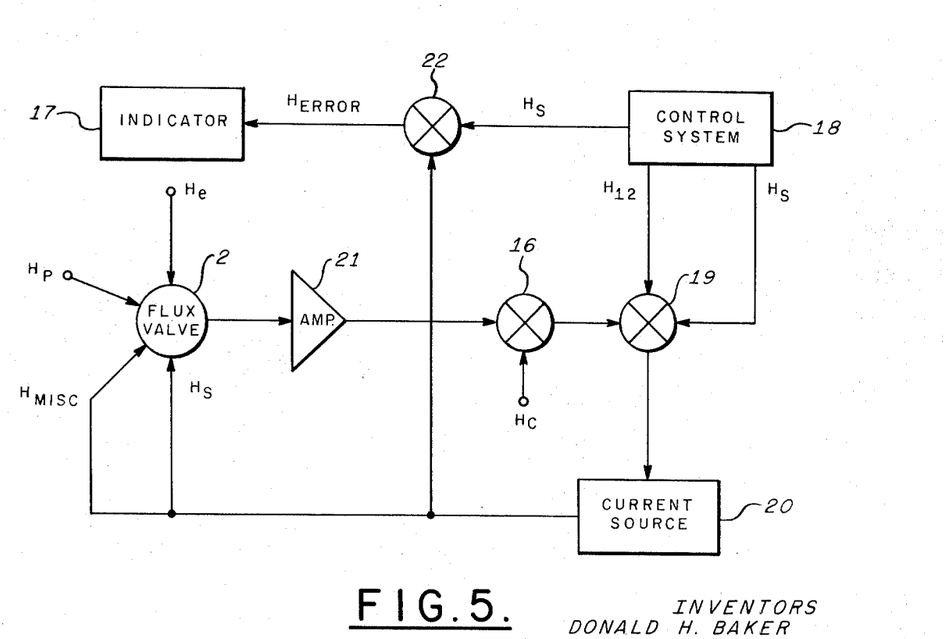
FIG. 5 illustrates a functional diagram of the signal flow during the swing procedure.

The Swing Mode of operation may first be more simply described in reference to FIG. 5. Flux valve 2 is representative of the flux valve subjected to the following magnetic fields and error sources: $H_e$ represents the earth's horizontal magnetic field; $H_p$ represents the permanent magnetic field due to the aircraft and its components; $H_{misc}$ represents the errors emanating from the AHRS, or control system circuitry. Summing junction 16 represents the point of insertion of a corrective signal, $H_c$, to null out the $H_p$ and $H_{misc}$ signals. The control system 18 generates the equivalent earth's field cancellation signals, $(H_{12})_1$, $(H_{12})_t$, rotated to the selected heading and transmits them to summing junction 19 and the earth's magnetic field signal, $H_e$, is cancelled.

The control system 18 also transmits the summing junction 19 a signal, $H_s$, representative of a standard earth's field at the selected swing heading. The current source 20, which may be a current servo, is responsive to the output of summing junction 19 and imposes upon flux valve 2 a field equivalent to the selected swing heading and a signal representative of $H_{misc}$. For clarification, the magnetic fields and signals imposed upon the flux valve 2 during the swing mode may be represented mathematically as:

$$H_e + H_p + H_{12} + H_s + H_{misc} + H_c = 0$$

where $H_e$ and $H_p$ are due to the magnetic environment $H_{12}$ and $H_s$ are generated by the control system.

$H_{misc}$ is due to the electronic circuitry, and $H_c$ is the correction insertion to null the errors.

The flux valve output is fed to amplifier 21, representative of signal matching and demodulation circuitry. The amplifier 21 output is fed to summing junction 16. Summing junction 16 also receives an input, $H_C$, from an error compensation circuitry 7 (FIG. 4a), representative of the signal required to null the error signal displayed on indicator 17. The output of summing junction 16, including the flux valve output and the correction signal, is summed with the other inputs ($H_{12}$, $H_S$) at summing junction 19. The output of the current source 20 then comprises essentially only the swing signal $H_S$ as the earth's field, $H_e$, has been nulled out, and $H_{misc}$. The output of the current source 20 is also fed to summing junction 22. Summing junction 22 also receives an input $H_s$ from the control system 18 representative of the equivalent earth's magnetic field at the selected swing heading. The output of the summing junction 22 is representative of the error present at the output of the control servo 9 (FIG. 2a) and would affect the aircraft heading control system.

This signal is converted at indicator 17 to present a display of the polarity and magnitude of the error signal. Thus, indicator 17 presents a visual display of the magnitude of the error at any selected heading.

Figure 4B:
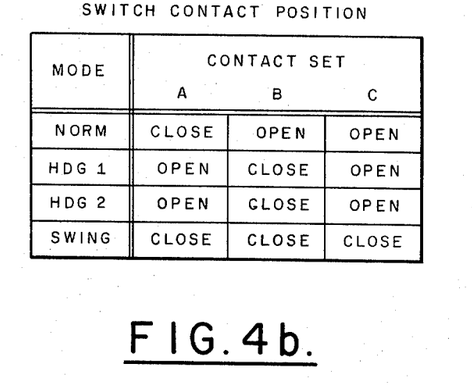
FIG. 4b illustrates a chart for the switch actuation.

In further detailed explanation of the SWING mode, reference is made to FIGS. 3, 4a and 4b. The SWING mode is selected on the calibrator mode switch 4, which closes contact sets A, B and C. The average cancelling field coordinates, $(H_{12})_1$ and $(H_{12})_t$ computed from the Hdg 1 and Hdg 2 modes and stored in the calibrator non-volatile memory 14, are rotated through the angle by the digital data processor 10 of the AHRS for the swing line 2 heading. The resulting rotated coordinates are sent through the D/A converter 11 to the compass calibrator sample and hold circuit 12 of the calibrator 3 and represent the actual aircraft heading, or the swing line heading corrected for misalignment.

The heading selector 23 on the calibrator 3 has a group of selectable headings representative of the swing heading and may be any one of 24 headings. The desired swing heading is determined by the heading selector 23 and the equivalent field coordinates of a standard earth's field (stored in the data processor 10) are rotated by the data processor 10. The resulting coordinates of the swing heading field are processed through the D/A converter 11 for storage in sample and hold 24 of the calibrator 3.

In the current servo 8, the output of sample and hold 12 effectively cancels the earth's field ($H_e$) output of flux valve 2. Concurrently, the output of sample and hold 24 causes current servo 8 to provide an output signal from the azimuth detector representative of the selected heading determined by the heading select switch 23. The output of the current servo 8 is fed to the data processor 10 through the A/D converter 9. The data processor 10 compares the output of the current servo 8 with the selected heading. If there is a discrepancy, an error is present. A signal representative of the error is processed by the binary to BCD converter 25 and is fed to indicator 17. Indicator 17, in the preferred embodiment, comprises logic circuitry capable of determining the sign and magnitude of the received error signal and will display two numerals with the appropriate polarity. Each of the numerals may be displayed by a seven segment numeric display as shown. An angle no larger than plus or minus 9.9° will be displayed. For larger angles, the indicator will go blank.

An operator may now adjust the compensating network 7 in conjunction with the error displayed on indicator 17 to decrease the error output of the data processor 10 at the selected heading. The compensating network 7 in effect biases the current servo 8 so that its output is more nearly matched to the desired output for any selected heading. In a manner well known to those skilled in the art, the single cycle and two cycle errors are determined and the appropriate compensatory values are inserted into the system through compensator 7 to null these errors.

After the displayed errors have been reduced to acceptable levels by use of the compensating network 7, the swing mode is completed. The mode switch 4 is returned to the position marked NORM and the calibrator may be disconnected from the vehicle, or aircraft 1. The calibration procedure is now complete.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A calibration system for calibrating a magnetic detector housed within a vehicle comprising
   means responsive to said detector for providing an output signal,
   means for combining the output of said detector at each of two predetermined headings approximately 180° apart to obtain an equivalent value of the earth's magnetic field,
   means for exciting said detector to produce a selected artificial magnetic heading output from said detector,
   means for calculating the expected output of said detector at said selected heading,
   means for algebraically adding the outputs of said combining means, said excited detector and said calculating means to obtain a resultant signal,
   means for displaying the difference between said resultant signal and said expected detector output, and
   means for compensating the output of said detector in accordance with said displayed difference to minimize said difference.

2. The apparatus of claim 1 wherein said magnetic detector comprises a precalibrated and preindexed flux valve.

3. The apparatus of claim 1 wherein said combining means comprises
   data processor means operably associated with said detector for producing a digital signal corresponding to said detector output signal at a first heading, and for producing a further digital signal corresponding to said detector output signal at a second heading rotating approximately 180° from said first heading,
   memory means for storing said digital signal obtained at said first heading and said data processor providing a signal corresponding to the difference between said stored signal and said further signal.

4. The apparatus of claim 3 wherein said combining means further comprises
   first means for algebraically adding to said digital signal at said first heading a signal corresponding to the misalignment of the vehicle and said first predetermined heading, and
   second means for algebraically adding to said digital signal at said second heading a signal corresponding to the misalignment of the vehicle and said second predetermined heading.

5. The apparatus as claimed in claim 1 wherein said displaying means comprises
   means for converting said difference signal to a binary coded decimal signal,
   means for displaying said coded signal as a numeric display, and
   means for additionally displaying the sense of said signal.

6. A method for calibrating a magnetic detector housed in a vehicle comprising
   deriving an output signal from said detector at each of two magnetic headings of said vehicle where said headings are approximately 180° to each other,
   combining each output of said headings to obtain a first resultant signal,
   imposing upon said detector an excitation equivalent to a preselected heading to produce an output signal from said detector equivalent to said preselected heading,
   calculating the expected output signal of said detector at said preselected heading,
   combining said detector output signal at said preselected heading with said calculated detector output signal and said first resultant signal to produce a second resultant signal,
   displaying said second resultant signal, and
   adjusting the output from said detector to minimize the value of said second resultant signal and thereby compensate for deviation errors in said detector.

7. The method as claimed in claim 6 wherein said step of deriving comprises
   orienting said vehicle to a first heading,
   storing the output signal of said detector at said first heading,
   reorienting said vehicle to a second heading approximately 180° greater than said first heading, and
   obtaining an output signal of said detector at said second heading.

8. The method as claimed in claim 7 comprising
   modifying the output signal at said first heading for misalignment of the vehicle with said first heading, and
   modifying the output signal of said second heading for misalignment of the vehicle with said second heading.

9. The method as claimed in claim 7 wherein said step of deriving comprises
   converting said detector output from an analog signal into a corresponding first digital signal, and
   storing said first digital signal in a memory.

10. The method as claimed in claim 9 wherein said step of combining comprises
    converting said detector output at said second heading from an analog signal to a corresponding second digital signal,
    combining said stored first digital signal with said second digital signal to obtain said first resultant signal, and
    converting said first resultant signal from a digital signal to an analog signal.

11. The method as claimed in claim 10 wherein said step of imposing comprises
    digitally computing the value of said excitation, and converting said digital value to an analog excitation value wherein said analog value is imposed on said detector,
    and said step of calculating comprises digitally computing the value of the expected output signal of said detector at said preselected heading, and converting said digital value to an analog value.

12. The method as claimed in claim 11 wherein said combining step comprises
    algebraically adding said analog values of said detector output, said calculated detector output, and said first resultant signal.

13. The method as claimed in claim 12 wherein said step of displaying comprises
- converting said second resultant signal from an analog value to a digital value,
- converting said digital value to a binary coded decimal value, and
- displaying said binary coded decimal value on an indicator.

14. In a magnetic compass system for navigable craft of the type wherein a magnetic detector mounted in said craft detects the direction of the earth's magnetic field relative to the heading of said aircraft and supplies an alternating current signal corresponding thereto, wherein said system includes a closed loop servo for generating direct current signals proportional to said compass signal which are fed back to said detector for nulling said alternating current signal whereby said direct current signals are proportional to said craft magnetic heading and further including signal processor circuits responsive to said direct current signals for supplying output control signals proportional to the magnetic heading of said craft, said magnetic compass system including apparatus for calibrating said magnetic detector for the effects of local magnetic fields within said aircraft, said apparatus comprising
- calibration mode selector means for connecting said processor circuits into said detector servo loop,
- means for providing an output corresponding to the difference between the outputs of said detector at each of two vehicle headings 180° apart, whereby to provide an earth's field cancelling signal,
- means for generating detector, plurality of signals corresponding to selected headings of said detector,
- means for algebraically combining said earth's field cancelling signal and each of said plurality of generated signals to produce a summed signal,
- means for inserting said earth's field cancelling signal and said summed signal into said servo loop, whereby the total signal in said servo loop includes a signal corresponding to the actual heading of said magnetic detector, on earth's field cancelling signal, a selected heading signal and a deviation error signal,
- means for segregating said deviation error signal,
- means for displaying said deviation signal, and
- means for inserting a signal into said servo loop to minimize said displayed signal.

* * * * *